May 5, 1931.  G. S. JOHNSTON  1,803,473
LENS TESTING DEVICE
Filed Nov. 21, 1927

Inventor
George S. Johnston.
By Harry H. Styll.
Attorney

Patented May 5, 1931

1,803,473

UNITED STATES PATENT OFFICE

GEORGE S. JOHNSTON, OF SAN FRANCISCO, CALIFORNIA, ASSIGNOR TO AMERICAN OPTICAL COMPANY, OF SOUTHBRIDGE, MASSACHUSETTS, A VOLUNTARY ASSOCIATION OF MASSACHUSETTS

LENS-TESTING DEVICE

Application filed November 21, 1927. Serial No. 234,713.

This invention relates to improvements in lens testing devices and has particular reference to a device for testing displacement of vision in bifocal lenses and color aberration in two part bifocal lenses.

The principal object of the invention is to provide improved means for a comparative test of monaxial bifocals with nonmonaxial bifocals as to the displacement of image in passing from the distance field to the reading field and vice versa.

Another object of the invention is to provide improved means for making a comparative test of the color aberration of two part bifocals caused by the difference in dispersion of the material from which the two sections of the bifocal are made.

Another object of the invention is to provide simple, efficient and inexpensive means for making comparative tests of lenses as to displacement of image and color aberration.

Other objects and advantages of the invention will become apparent from the following description taken in connection with the accompanying drawings, and it will be understood that I may make any modifications in the specific arrangement of parts and details of construction shown and described within the scope of the appended claims without departing from or exceeding the spirit of the invention. I, therefore, do not wish to be limited to the exact details of construction and arrangement of parts shown as the same have been shown only by way of illustration.

Referring to the accompanying drawings.

Figures 1, 2, 3, 4, 5:
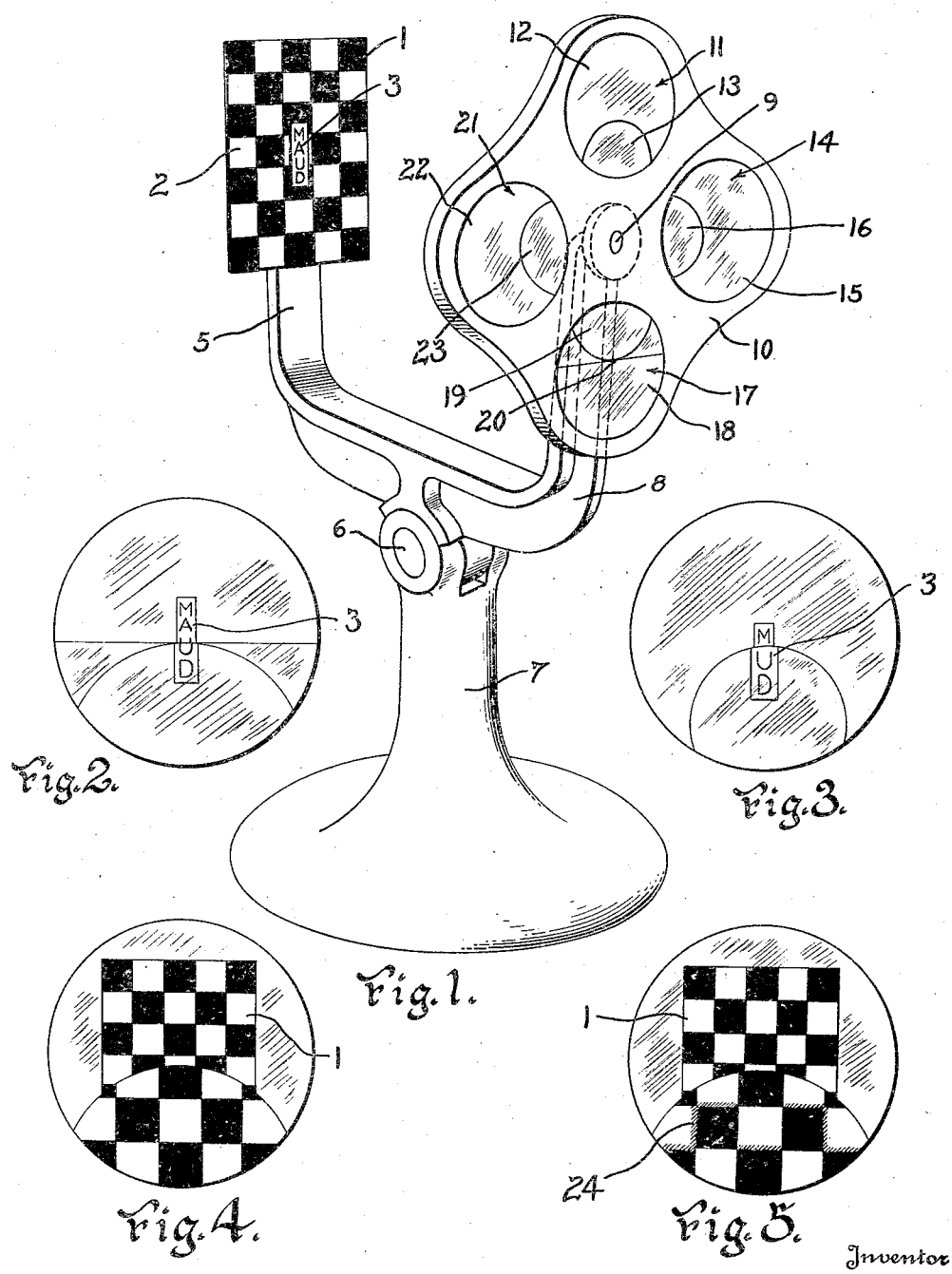
Fig. 1 is a perspective view of the invention showing the lens holder and test chart.
Fig. 2 is a diagrammatic front view of a bifocal lens overlying a portion of the chart showing the displacement of image at the line of division between the distance and the reading fields in the case of a monaxial bifocal lens.
Fig. 3 is a view similar to Fig. 2 illustrating the same conditions in the case of a non-monaxial bifocal lens.
Fig. 4 is a diagrammatic view of a two part bifocal lens overlying the chart showing the absence of color aberration in a bifocal lens where the dispersion of the glass of the reading portion and the distance portion is substantially equal.
Fig. 5 is a view similar to Fig. 4 showing the presence of color aberration due to the difference in dispersion of the glass forming the distance portion from that forming the reading portion.

In recent years there has been a marked development in the two main types of bifocal lenses, namely, the so-called one-piece bifocal lens comprising a plurality of visual fields ground on a single piece of glass, and in the fused bifocal lenses having a plurality of fields made of glass of different refractive index. The main development in the so-called one-piece bifocal lens has been in the attempt to eliminate the displacement of image when passing from the distance field to the reading field or vice versa, which has been brought about in the so-called monaxial bifocal, that is, where the centers of both the distance field and the reading field lie on a line passing through the line of joinder of the two fields; in such a lens there is no sudden displacement of the image in passing from one field to the other. A great many bifocal lenses are sold as monaxial bifocal lenses when in reality they are not, they being eccentric or having a displacement of the image at the dividing line. It is, therefore, one of the objects of my invention to provide a test by which a monaxial lens may be distinguished from a non-monaxial lens in this respect.

In the so-called fused bifocal lenses, that is, where the distance lens is made of a glass of one refractive index and the reading lens is made of a piece of glass of a different refractive index fused or otherwise secured to the main field, the trend of improvement has been to eliminate the color fringes around an image through the lens due to the difference in dispersion of the glass of the distance field from that of the reading field. In those lenses in which the glass of the reading field and the glass of the distance field have substantially the same dispersion there is no color fringe around the edges of the image, whereas in those fused bifocals having a difference in dispersion between the two pieces of glass there is a decided color fringe surrounding the edges of the image, as is well known in the prior art lenses. It is, therefore, another object of my invention to provide simple means by which a fused bifocal lens may be tested to ascertain whether or not the two pieces of glass forming it are of substantially the same dispersion or whether or not they are of different dispersion and will produce color fringes.

This is a very important matter to the wearer of bifocals as it prevents the fostering of one type of bifocal in place of the other, which is of considerable importance because bifocals which eliminate color fringes around the image and bifocals which eliminate displacement at the line of division are more expensive lenses to manufacture and consequently sell for a higher price.

Referring to the drawings wherein similar characters of reference denote corresponding parts throughout, I provide a test chart 1 having a checkerboard section 2 for determining the color fringes and having superimposed upon the checker board chart a plurality of aligned characters 3 for the determination of displacement.

The whole chart 1 is mounted in a bracket 5 pivoted at 6 to a stand 7. On the arm 8 of the bracket 5 and pivoted thereto at 9 is a lens holder 10 in which is mounted the lenses to be tested. In the present illustration 11 represents a fused bifocal lens having a distance portion 12 of one dispersion and the reading portion 13 of a different dispersion. 14 represents a fused bifocal lens having a distance portion 15 of relatively the same dispersion as the reading portion 16. 17 is a monaxial one-piece bifocal having the distance field 18 and the reading field 19 ground on one piece of glass in such a way that the center of curvature of the reading field on the bifocal side and the center of curvature of the distance field on the bifocal side will lie on a line passing through the point 20 which is the line of joinder between the distance field and the reading field. 21 is a one-piece bifocal lens having the distance field 22 and the reading field 23 ground on one piece of glass, but the center of the reading field does not lie on a line passing through the line of intersection of the two fields and the center of the distance field, the lens being not monaxial but eccentric. The lens holder 10 may be rotated on the pivot 9 to bring any one of the desired lenses 11, 14, 17 and 21 in line with the chart 1 and by looking through the lens at the chart 1 moving the head to get the proper position of the eye as regards the bounding line of the two fields, the following comparative tests may be easily and accurately made.

Aligning the lens 11 with the chart: This lens is a fused lens and there is a difference in dispersion between the reading and distance fields. The lens is aligned with the chart and the eye arranged to look at the chart through the reading segment of the lens.

The color fringes 24, Fig. 5, may be distinctly seen along the edges of the checker members of the chart 1. If the displacement figures 3 forming the letters M A U D are looked at along the line of division one of the characters, as for instance A, may be made to disappear as shown in Fig. 3, if the lens is not monaxial. If the lens is monaxial all of the characters will appear with a slight displacement shown as in Fig. 2. If the lens 14 is thrown in line with the chart 1 and used as before there will be no color fringes as shown at 24 in Fig. 5 due to the fact that the dispersion of the reading and distance portions is substantially the same and the lens may be tested as to whether it is monaxial or not as before.

Fig. 4 illustrates the test of the lens 14 as to color fringes, there being no lines or fringes shown as at 24 in Fig. 5. If the lens 17 is thrown into line with the chart, it being a monaxial lens there will be no disappearance of one of the test characters 3. The characters M A U D will appear about as shown in Fig. 2. If the lens 21 is thrown in line with the chart it being a one piece lens it may be tested for displacement. This being not a monaxial lens but an eccentric lens one test character, as A, may be made to disappear and an image of the test characters 3 will be shown somewhat as in Fig. 3.

It is clear that other and various kinds of lenses may be inserted in the lens holder for various tests. The lenses being arranged in the rotatable lens holder it makes an easy arrangement for comparative tests, as for instance a fused lens having its fields of different dispersion may be rotated in line with the chart to show the color fringes and then one having practically the same dispersion for the two fields may be thrown into line showing an absence of color; likewise a monaxial lens may be put in to show the displacement of the test characters 3 and a one piece lens having eccentric fields may be rotated into line with the chart to show the displacement wherein one or more of the characters may be made to disappear.

The instrument is neat and attractive in appearance and may be used on a fitting table or counter of the optical dispenser's office where it may be shown to the patient at the time he is having his eyes examined or having his glasses fitted. The device provides a simple, neat, efficient and economical means of comparative test which is of considerable aid to the prospective wearer of glasses providing means wherein the different properties of the various lenses may be clearly and graphically represented to him.

From the foregoing description it will be seen that I have provided economical and efficient means for carrying out all the objects of the invention.

Having described my invention, I claim:

1. In a lens testing device, a lens holder having openings therein, multifocal lenses in the openings, and a test chart aligned with the lens holder and having a checkerboard arrangement of test objects of alternate black and white squares and a central panel having a series of vertically arranged letters separated one from the other.

2. In a lens testing device, a lens holder having openings therein, multifocal lenses in the openings, one lens being formed of superimposed layers of glass of different dispersion and another lens of superimposed layers of glass of similar dispersion, a third lens being formed of one piece of glass having the center of curvature of the reading field lying in a straight line passing through the line of joinder of the distance and reading fields and the center of curvature of the distance field and a fourth lens being made of one piece of glass having the center of curvature of the reading field removed from the aforesaid straight line, a test chart aligned with the lens holder and having a checkerboard arrangement of test objects of alternate black and white squares and a central panel having a series of vertically arranged letters separated one from the other.

3. In a lens testing device, a lens holder having a plurality of lenses therein and a test object aligned with the lenses having test means of alternating colors for testing chromatic aberrations and test means of separately arranged test objects for testing the prism displacement of the lenses.

GEORGE S. JOHNSTON.